L. J. CAMPBELL.
TRANSMISSION DEVICE.
APPLICATION FILED SEPT. 19, 1913

1,162,336.

Patented Nov. 30, 1915.
6 SHEETS—SHEET 3.

Witnesses:

Inventor:
Leon J. Campbell
by Poole & Cromer
Attys

UNITED STATES PATENT OFFICE.

LEON J. CAMPBELL, OF CHICAGO, ILLINOIS, ASSIGNOR OF ONE-HALF TO JAMES T. HEALY, OF CHICAGO, ILLINOIS.

TRANSMISSION DEVICE.

1,162,356.     Specification of Letters Patent.     Patented Nov. 30, 1915.

Application filed September 19, 1913. Serial No. 790,589.

*To all whom it may concern:*

Be it known that I, LEON J. CAMPBELL, a citizen of the United States, and a resident of Chicago, in the county of Cook and State of Illinois, have invented certain new and useful Improvements in Transmission Devices; and I do hereby declare that the following is a full, clear, and exact description thereof, reference being had to the accompanying drawings, and to the letters of reference marked thereon, which form a part of this specification.

This invention relates to a device in the nature of a transmission mechanism for transmitting power from a driving shaft to a driven shaft.

Among the objects of the invention is to provide a simple, durable, inexpensive, yet efficient power transmitting mechanism devoid of gears and which may be adjusted to vary the speed ratio between the driving shaft and the driven shaft.

The parts of the transmission mechanism forming the subject-matter of the present invention are so designed, arranged and constructed, that such adjustment for varying the speed between the driving and the driven shaft may take place while the parts of the device are in operation and under full load. Furthermore, the construction and arrangement of the parts is such that the transmission mechanism may be employed for transmitting power from a driving to a driven shaft that is arranged at right angles to the former, without the interposition of gears or the like between the driving and driven members mounted on the driving and driven shafts, respectively.

The invention consists in the matters hereinafter described and more particularly pointed out in the appended claims.

In the accompanying drawings

Briefly stated, my transmission mechanism, in the form herein illustrated, comprises a plurality of driving members mounted on the driving shaft and an equal number of driven members mounted on the driven shaft, the former having operative connection with the latter and between the two power is transmitted from the driving shaft to the driven shaft. The driving members each embrace a pair of eccentric members, one eccentric member of the pair being fixed on the driving shaft, while the other eccentric member is mounted on the first mentioned eccentric member and adapted to be shifted or adjusted circumferentially about the same, in order to shift the center of the shiftable eccentric member from concentricity to eccentricity with respect to the center of the driving shaft. The shiftable eccentric members are connected together, so that the adjustment of the one will effect adjustment of the rest. The driven members, on the other hand, each embrace a pair of parts, one of the parts of said pair being mounted on and rigidly secured to the driven shaft and adapted to rotate therewith, while the other part of the pair is loosely mounted on the first mentioned part. Each of the parts of the pair of the driven members is provided with means adapted to be brought into and out of interlocking engagement with each other, so that during a certain period the parts are connected together whereby the rotation of one will effect rotation of the other. Each of the driving members is provided with an operative arm given endwise movement by the rotation of the eccentric members mounted on the driving shaft. The driven members are each provided with a rock-arm connected with the associated operating arm of the driving members. It follows that the operating arm in the endwise movement thereof rocks the rock-arm and thus actuates the driven members which give rotation to the driven shaft. By adjusting the shiftable eccentric members, the throw thereof is varied and consequently varying the amount of movement given to the driven members, this resulting in varying the speed ratio between the driving and the driven shafts. The parts of the device are so designed and constructed that such adjustment may take place during the operation thereof and while under full load. The arrangement of the parts of the driven members is such that, when one driven member has just about completed its power stroke, another of the driven members is out of engagement with the driven shaft, it just having completed its non-operative stroke and about starting on its power stroke, while the remaining driven member is at the middle of its power stroke. Thus continuity of rotation of the driven shaft is gained. Mechanism is also provided whereby the direction of rotation of the driven shaft may be reversed whenever desired and without stopping the driving shaft.

The accompanying drawings illustrate in detail a transmission device constructed in accordance with my invention. In the drawings, the driving members are constructed as follows: The driving and driven shafts indicated by 20 and 21, respectively, are arranged at right angles to each other with one above the other and both projecting into a hollow casing 22 inclosing the operative parts of the device. Said casing 22 is provided with alined but spaced bearings 23 and 24 in which the driving shaft 20 is journaled. Keyed or otherwise rigidly secured to a driving shaft 20, between the bearings 23 and 24, are a plurality of eccentric members 25, 26 and 27. (See Fig. 4.) Said eccentric members 25, 26 and 27 are so arranged that their centers are not only eccentric with the center of the driving shaft 20, but are also eccentric with respect to each other. As shown in the drawings, and especially in Fig. 4 thereof, said eccentric members 25, 26 and 27 are arranged closely adjacent each other, with the eccentric member 26 interposed between the eccentric members 25 and 27. Hereinafter the eccentric members 25 and 27 will be designated as the inner and outer eccentric members, respectively, while the eccentric member 26 will be spoken of as the intermediate eccentric member. The hub of the inner eccentric member 25 is greater in length than the length of the hubs of the intermediate and outer eccentric members 26 and 27 combined, the purpose of which will presently appear. Rotatably or loosely mounted on each eccentric member 25, 26 and 27, is a shiftable eccentric member 28, 29 and 30, respectively. The shiftable eccentric members 28, 29 and 30 are adapted to be adjusted or shifted circumferentially with respect to the eccentrics upon which they are mounted, and hereinafter these eccentric members will be designated as shiftable or adjustable eccentrics; the shiftable eccentrics 28 and 30 being the inner and outer ones, respectively, while the shiftable eccentric 29 is the intermediate one. Said inner shiftable eccentric 28 is connected with the adjacent intermediate shiftable eccentric 29, preferably by means of a laterally projecting pin 31 carried by the former and engaging a slot or recess provided therefor in the adjacent edge of the latter. In like manner, the intermediate shiftable eccentric 29 is connected with the outer shiftable eccentric 30 by a pin 32 engaging a slot or recess provided therefor in the adjacent edge of the outer shiftable eccentric 30. Said pin 32 is shown in dotted lines in Fig. 4. In this manner, all of the shiftable eccentrics are connected together, whereby a movement of one will impart a simultaneous movement of the rest. Working on each shiftable eccentric 28, 29 and 30, is an eccentric strap 33, 34 and 35, respectively. (See Figs. 1, 2, 3 and 4.) Each eccentric strap is, as shown in the drawings, made in two parts, each part being provided with laterally projecting ears or lugs 36, 37, through which are inserted clamping bolts 38, by means of which the eccentric straps are applied to the shiftable eccentrics.

Figure 4:
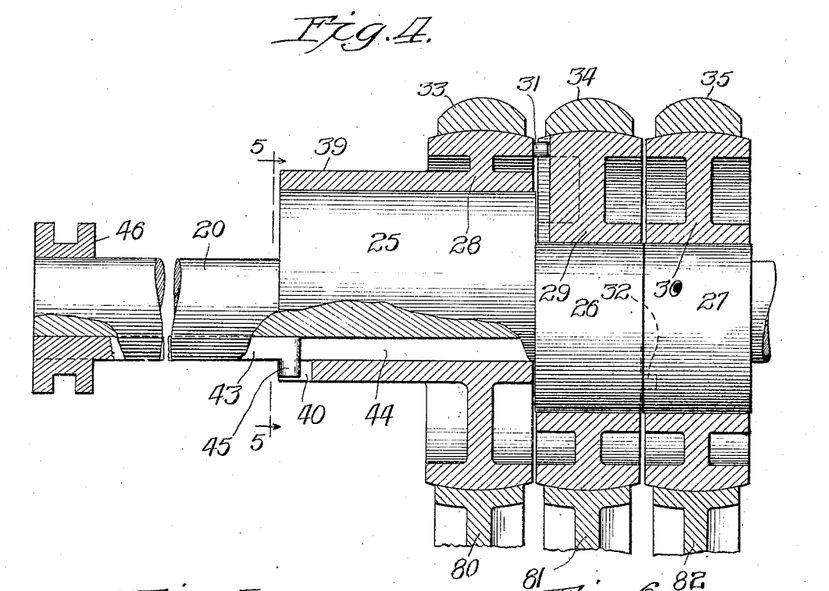
Fig. 4 is a vertical, longitudinal, sectional view partly in elevation of the driving shaft and the driving members mounted thereon.
Figures 5, 6:
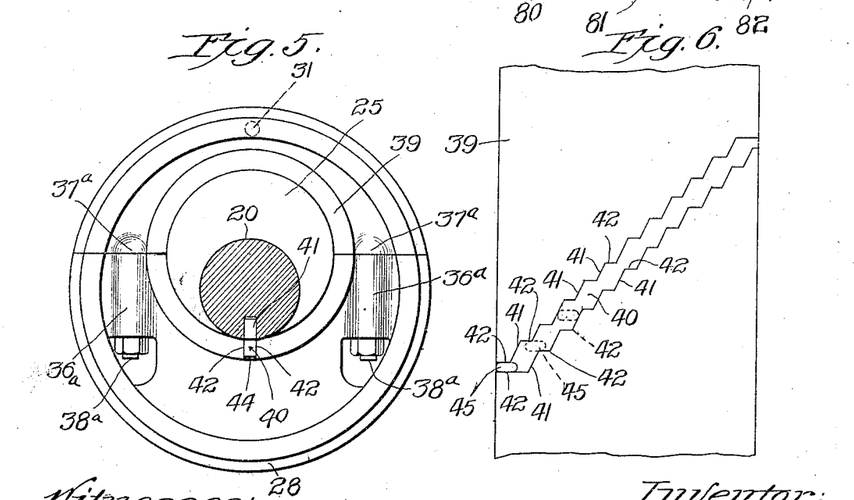
Fig. 5 is a transverse sectional view, taken on line 5—5 of Fig. 4.
Fig. 6 is a view showing a development of the spirally arranged slot in the sleeve of one of the operating or shiftable eccentric members, to be hereinafter described.

Projecting laterally from the inner shiftable eccentric 28, in a direction away from the other shiftable eccentrics, is a sleeve or annular member 39, the bore of which forms a continuation of the bore of the shiftable eccentric 28. Said sleeve or annular member 39 is preferably made integral with the shiftable eccentric 28, but it is to be of course understood that said sleeve 39 may be made separate from the shiftable eccentric 28 and connected therewith in any preferred manner. Said sleeve or annular member 39 is adapted to embrace or encircle that portion of the inner eccentric 25 not embraced by the shiftable eccentric 28 proper, as shown in Fig. 4. The sleeve 39 and the shiftable eccentric 28 combined embrace the entire outer circumferential surface of the eccentric 25 and constitute, in effect, one shiftable eccentric member. Formed in said sleeve 39 is a spirally arranged slot 40 which opens outwardly through the free end of said sleeve 39. (See Fig. 4.) Said slot 40 also opens into the bore of said sleeve 39 and extends for a distance through an angle of 180° or more, but not less. The opposite side walls of said slot 40 are step shaped, so as to provide a plurality of parallel flat faces 41 and 42, the former set of faces 41 extending at an angle to the axis of rotation of said sleeve 39, while the latter set of faces 42 extend parallel to the axis of rotation of the said sleeve 39. In other words, the flat faces 41 extend in the same direction as the slot, while the faces 42 extend at an angle to the length of the slot. Each flat face 41 is separated from the next adjacent like face by the flat face 42. A development of the slot is shown in Fig. 6. The purpose of making each side of the slot 40 step shaped, as above described, will presently appear.

Figure 1:
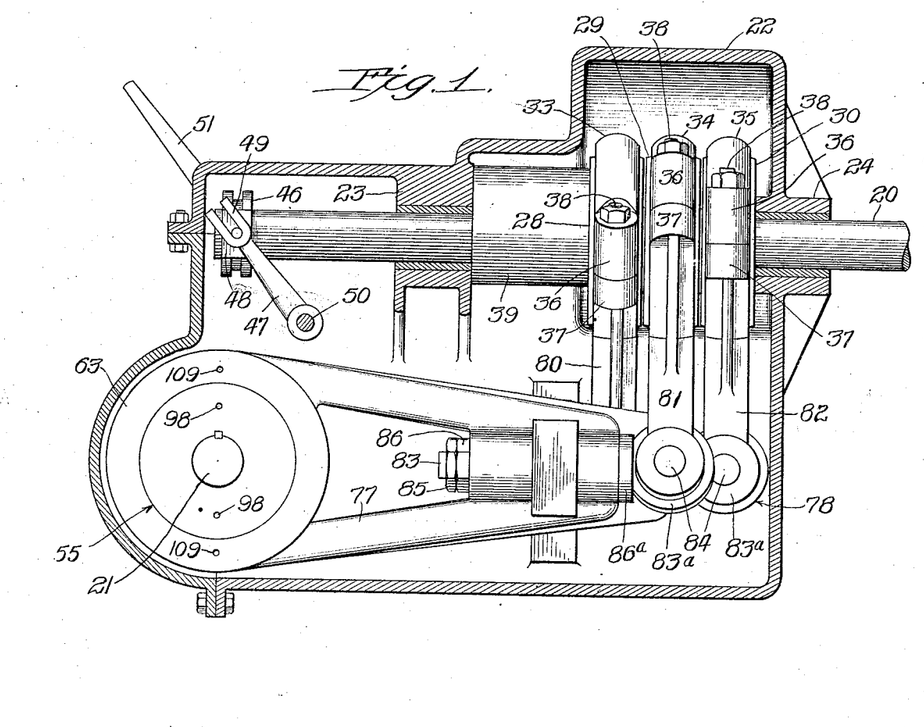
—Figure 1 is a side elevational view of a transmission mechanism constructed in accordance with my invention; the casing inclosing the operative parts of the same being shown in section.
Figure 2:
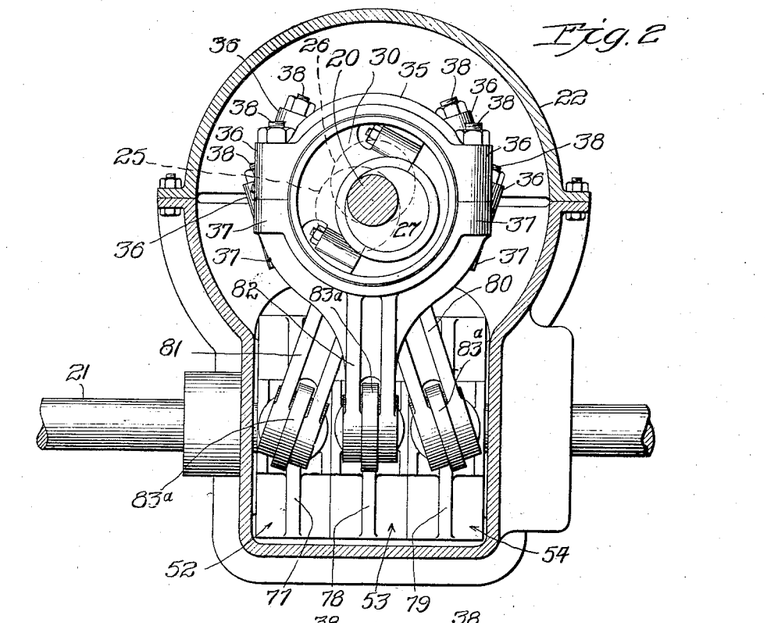
Fig. 2 is an end elevation of the parts shown in Fig. 1, the casing being also shown in section.
Figure 3:
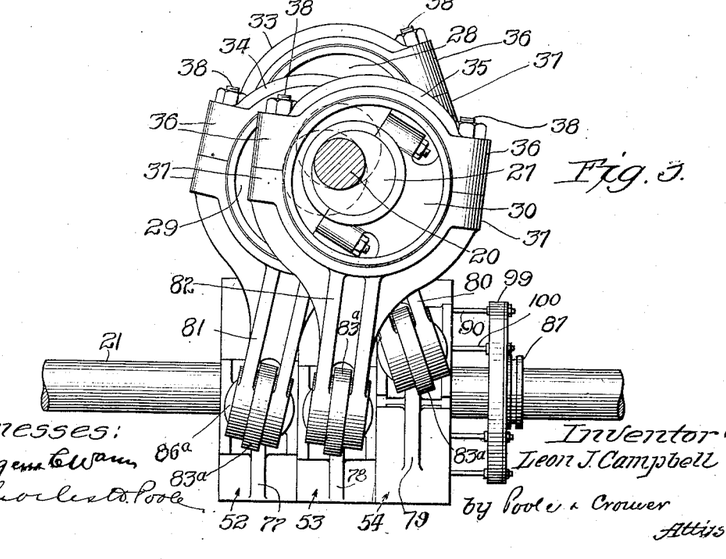
Fig. 3 is a similar view, the operative parts of the device being shown in a position different than that shown in said Fig. 2; the casing being omitted.

To effect the adjustment of the several shiftable eccentrics circumferentially with respect to the eccentrics 25, 26 and 27 and the driving shaft 20, so as to move the said shiftable eccentrics from concentricity to eccentricity with respect to the driving shaft 20 and thus vary the throw of said eccentrics, the following construction has been devised: A key 43 (see Fig. 4) is mounted to slide endwise in a key seat or groove 44 provided therefor in that portion of the driving shaft 20 which extends laterally from the inner eccentric 25. Said key seat 44 extends longitudinally of that part of the shaft 20 and opens through the end thereof, as shown in Figs. 4 and 5. Said key seat 44 is continued through the inner eccentric 25. Said key 43 is provided at its inner end with an outwardly projecting part or finger 45 adapted to project into said spirally arranged slot 40. Said key 43 is shifted or moved endwise in its key seat 44 by suitable shifting mechanism having operative connection therewith. As shown in Figs. 1 and 4, said shifting mechanism comprises a grooved collar 46 loosely mounted on the driving shaft 20 and connected with the non-fingered end of said key 43. For moving said collar 46 laterally so as to effect the endwise movement of the key 43, a yoke member 47 is provided, the same having connection with said collar 46 through blocks 48 each having a pin 49 projecting into the slot in the end of the arm of said yoke member 47. Said yoke member 47 is mounted on a rock-shaft 50 extending into the casing 22 and transversely of and below the driving shaft 20. (See Fig. 1.) Said rock-shaft 50 is extended at one end beyond the side wall of the casing and to which end is secured an operating arm 51 by means of which the yoke member 47 is operated to effect the shifting of the key 43. The endwise movement of said key 43 in a direction to cause the finger 45 to move into the slot 40 will cause the shiftable eccentrics 28, 29 and 30 to be moved or adjusted about the shaft 20.

To connect the driving shaft 20 with the driven shaft 21 so that the power of the driving shaft will be imparted to the driven shaft, driven members are provided, the same being mounted on the driven shaft and connected with the eccentrics on the driving shaft in a manner to be hereinafter described. The driven members have the following construction: As hereinbefore stated, the driven shaft 21 extends into the casing 22 below and at right angles to said driving shaft. The said driven shaft 21 is journaled in bearings in the side walls of said casing. Mounted on the driven shaft 21 and within the casing, are a plurality of driven members 52, 53 and 54, as best shown in Figs. 7 to 10, both inclusive. As shown in the drawings, there are the same number of said driven members as there are driving members on the driving shaft 20, each driven member being connected with a driving member in the manner to be hereinafter described. As the general construction of one driven member is the same as each of the other driven members, a description of one will, it is thought, suffice for all; the reference characters being the same throughout and indicating similar parts, but where one driven member differs from another driven member this difference will be particularly referred to.

Figures 7, 8, 11:
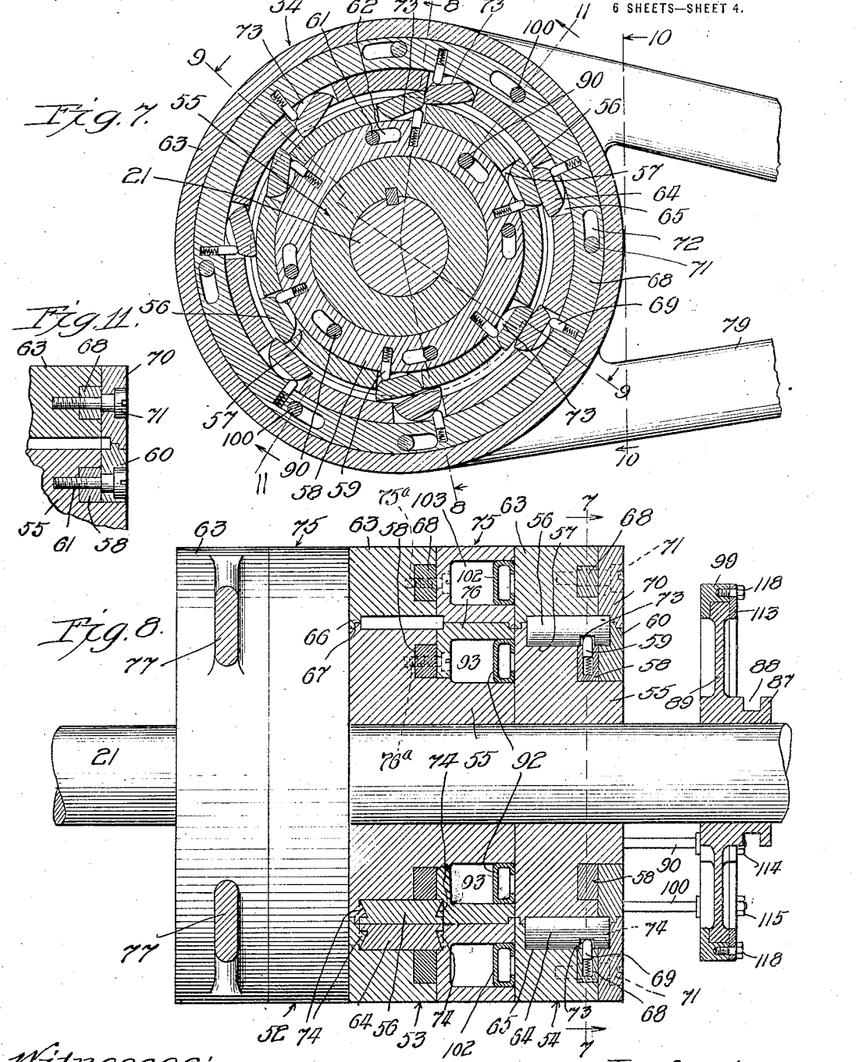
Fig. 7 is a transverse vertical sectional view, taken on line 7—7 of Fig. 8.
Fig. 8 is a view of the driven shaft and the several driven members mounted thereon; the right-hand driven member being shown in section and as taken on line 8—8 of Fig. 7; the left-hand and intermediate driving members being shown in elevation and section, respectively, and taken on lines 9—9 and 10—10, respectively, of said Fig. 7.
Fig. 11 is a fragmentary detailed sectional view of certain parts to be hereinafter described.

As shown, each driven member comprises a rotary member or hub 55 (see Figs. 7, 8, 9 and 10) keyed or otherwise rigidly secured to the driven shaft 21. Mounted on said hub 55 are a plurality of circumferentially spaced pawls or locking teeth 56, rockably mounted in suitable seats 57 provided therefor in the outer cylindrical surface of said hub. Each pawl or locking tooth 56 is substantially semicylindrical in cross-section, and is arranged so that the convex surface thereof is in the seat 57. Said pawls 56 are arranged to extend transversely of said hub, as shown in Fig. 8. Any number of pawls or teeth 56 may be provided, but, as shown, six pawls are employed and the same are spaced substantially an equal circumferential distance apart. Mounted on the hub 55 in an annular, laterally opening channel, is a shift ring or annular member 58, provided with a plurality of radially projecting, circumferentially spaced, spring pressed plungers 59. The annular channel in which said ring 58 is mounted is below and opens into the several pawl seats 57. There are the same number of plungers 59 carried by said ring 58 as there are pawls 56 on the hub 55. Said plungers 59 project from said ring into the pawl seats 57 and are adapted to engage and bear against the under surface of said pawls. (See Figs. 7 and 8.) In the driven member 54, the ring 58 is maintained in position within the annular channel in which it is located by an annular plate 60 secured to the side of said hub 55 by means of fastening members, preferably in the form of machine screws 61. (See Fig. 11.) Said screws 61 pass through circumferentially extending slots 62 in said plunger-carrying ring 58. By reason of said slots 62, the ring 58 may be shifted or moved circumferentially on the hub for the purpose as will hereinafter appear; the screws limiting the amount of movement of said ring 58 in either direction.

Rotatably mounted on the hub 55 is an annular oscillatory member 63 carrying a plurality of circumferentially spaced pawls or locking teeth 64 rockably mounted in seats 65 provided therefor. Said pawl seats 65 open into the bore of said annular member 63, and it follows, therefore, that when said pawls or locking teeth 64 are rocked in their seats, one edge of the pawl will project into the bore of the annular member 63 and be in the path of movement of the projecting edge of one of the pawls 56 carried by said hub 55. When the projecting edge of one of the locking pawls 64 contacts with the projecting edge of one of the pawls 56 on the hub, the hub and annular member 63 are connected together and the annular member may be moved to effect the movement of the hub and consequently rotate the driven shaft 21.

In order to provide an annular space between the hub 55 and the annular member 63, into which the pawls on said parts may project, the member 63 is provided at one side with an annular, radially inwardly extending flange 66 adapted to have bearing against a radially outwardly extending annular flange 67 on the hub 55. Said flanges 66, 67 have interlocking engagement with each other, as shown in Fig. 8. The locking pawls 64 outnumber the first mentioned set of pawls 56 by one, and are, as in the case of the pawls 56, spaced substantially an equal circumferential distance apart. The pawls 56, hereinbefore described, may be termed the inner pawls, while the last set of pawls 64 may be called the outer pawls, for the sake of convenience in referring to them. Said annular member 63 carries a shift ring 68 located in an annular, laterally opening channel provided therefor in said annular member 63. The channel, in which said ring 68 is located, is located radially outward from and opens into the several pawl seats 65 of the outer set. Said ring 68 carries a plurality of radially, inwardly projecting, spring pressed plungers 69, similar in all respects to the plungers 59 hereinbefore referred to. Said plungers 69 are arranged circumferentially about said ring 68, and project into the pawl seats 65 and engage the outer surfaces of the pawls 64 therein. In the case of the driven member 54, the plunger-carrying ring 68 is held in the annular channel in which it is located by means of an annular plate 70 secured to the outer side of the annular member 63 by fastening members, preferably in the form of machine screws 71. (See Fig. 11.) Said screws 71 project through elongated, circumferentially extending slots 72 in the ring 68. In this manner the ring 68 is secured to the annular member 63 and is permitted to be moved or shifted circumferentially with respect to the annular member 63, for shifting the position of the plungers 69. Said annular plates 60 and 70 have rotative bearing and interlocking engagement with each other, as best shown in Figs. 8 and 11. By reason of the engagement of the flanges 66 and 67 at one side of the driven member 54, and engagement of the plates 60 and 70 at the opposite side of the driven member, the member 63 is not only prevented from moving laterally with respect to the hub, but the annular space between the member 63 and the hub is made possible. Into the annular space between the hub 55 and the member 63 one edge of both the inner and outer sets of pawls are adapted to be projected by the associated plungers 59, 69, respectively. In the construction of said driven member 54, the plates 60 and 70 and the flanges 66 and 67 serve as the end walls of the pawl seats 57, 65, respectively, and between which the pawls are located. Said plates and flanges prevent endwise movement of the locking pawls in their respective seats. As in the case of the inner pawls 56, the outer pawls 64 are substantially semi-circular in cross-section with the convex side in the seat. Each pawl of the inner and outer sets is provided with a slot 73 in its convex or under surface. Said slot 73 extends transversely of the pawl and into which the associated plungers 59, 69 extend. The bottom of said slot 73 is straight. When the spring pressed plungers 59, 69 are in position to bear against the associated pawls 56, 64 at one side of the slot 73, the pawls will be rocked in their seats and that side edge of the pawl or key adjacent the end of the slot into which the plungers extend will be projected into the annular space between the hub 55 and the annular member 63. The plungers 59, 69 may be made to occupy the opposite end of the slot 73 by shifting the pawl-carrying rings 58, 68 in the desired direction. Mechanism has been provided for shifting the rings 58, 68 and will be hereinafter described. Each pawl of each set is provided in its opposite ends with inwardly directed, V-shaped grooves 73ª, 73ª, the apex of which terminates in the flat outer face of the pawl, namely that surface facing the space between the hub and the annular member. The faces of the grooves 73ª, 73ª are rounded. Into the grooves 73ª, 73ª project and fit rounded projections or lugs 74, 74. In the driven member 54, said lugs 74, 74 are provided on the hub 55 and the plate 60 for the inner set of pawls 56, and on the annular member 63 and the plate 70 for the pawls 64 of the outer set. In the driven members 52 and 53, however, the lugs 74, 74 are provided on the hub 55 and the annular member 76 for the pawls 56 of the inner set and on the annular members 63 and 75, respectively, for the pawls 64 of the outer set. Said members 75, 76 constitute part of the shifting mechanism to be presently described. (See Figs. 8, 15, 16 and 17.) By reason of the construction just described, the pawls are permitted to have rocking movement in their seats but are prevented from falling out of said seats.

For connecting the driving members on the driving shaft with the driven members 52, 53 and 54 on the driven shaft 21, so that power may be transmitted from the driving to the driven shaft, the following construction has been devised: The annular member 63 of each driven member is provided with a rock-arm or connecting rod 77, 78 and 79, respectively. (See Figs. 1, 2, 7 and 8.) Said rock-arms are preferably in the form of yokes and are preferably made integral with the associated annular member 63. The rock-arms extend radially from the annular member 63 in the same direction and toward a common point. (See Figs. 1, 2 and 3.) The eccentric straps 33, 34 and 35, hereinbefore referred to, are each provided with an operating or power arm 80, 81 and 82, respectively; said operating or power arms extend in the same direction and toward the rock-arms 77, 78 and 79. Journaled in the outer end of each rock-arm, so as to rotate about an axis at right angles to the driven shaft 21, is an eye bolt 83 (see Fig. 1), the eyed portion 83ª of which extends beyond the free end of said rock-arm. The end of each operating or power arm 80, 81, 82, adjacent the associated rock-arm, is bifurcated and into the space provided the eye 83ª of said bolt extends. Said power arms are connected with said rock-arms by pins or bolts 84 inserted through the bifurcated ends of said power arms and the eye 83ª in said bolts 83. Said bolt 83 is permitted to rotate about its longitudinal axis but is prevented from endwise movement by means of clamp nuts 85, 86 applied upon the end thereof opposite the eye 83ª. A collar 86ª is located between the eye 83ª of the bolt and the outer end of the rock-arm. (See Fig. 1.) By reason of the construction above described, the rock-arms are rocked in the endwise movement of the power or operating arms and the latter permitted to move out of a vertical plane about the bolts 83 as pivots in the movement of said power arms by the eccentric straps to which said arms are connected.

The mechanism, hereinbefore referred to, for shifting the plunger-carrying rings 58, 68 to effect the reversing of direction of rotation of the driven shaft 21, is constructed as follows: Particular attention is called to Figs. 9 and 10 of the drawings. Loosely mounted on the driven shaft 21, exterior to the driven member 54, is a collar 87 provided with an outwardly opening, peripheral groove 88, by means of which a shifting yoke (not shown) may be connected with said collar. Said collar 87 is adapted to be moved endwise of said driven shaft 21. The collar 87 is provided with a radially extending annular flange 89 to which is connected, at diametrically opposite points, endwise movable shift rods 90. Said shift rods 90 are parallel to the driven shaft 21 and extend transversely through the driven member 54. In extending through the driven member 54, said rods 90 extend through the annular plate 60 and through one of the elongated, circumferentially extending slots 62 in the plunger-carrying ring 58 of said driven member 54. The end of each of said shift rods 90 opposite the end connected with the flange 89 extends beyond the hub of the driven member 54 and is provided with an enlargement or head 91 fitting within the annular channel of the annular member 92 adapted for lateral movement in an annular chamber 93 provided in the hub of the next adjacent driven member 53. Said annular chamber 93 is formed by the hub 55 and the annular member 76 secured to said hub. Secured to said annular channeled member 92 at diametrically opposed points are shift rods 94 movable endwise therewith and with said first set of shift rods 90. Said second set of shift rods 94 extend through the hub 55 of the driven member 53 and also through one of the circumferentially extending slots 62 in the plunger-carrying ring 58 of said driven member 53. Said shift rods 94 extend beyond the driven member 53 and are provided at their ends with enlargements or heads 95, similar in all respects to the heads 91 of the shift rods 90. Said heads 95 fit within the annular channel of an annular member 96 located in and adapted for lateral sliding movement in annular chamber 96ª formed in the hub of the driven member 52. As in case of the driven member 53, said annular chamber 96ª is formed by the hub 55 and the annular member 76 secured to said hub. Extending through and secured at diametrically opposed points to said annular channel member 93, are shift rods 97. Said shift rods 97 extend partially through the hub of the driven member 52 and also through one of the circumferentially extending slots 62 in the plunger-carrying ring 58 of said driven member 53. The outer or free ends of said shift rods 97 play in slots 98 provided in the hub of said driven member 52. Rotatably mounted on the flange 89 of said collar 87, is an annular ring or member 99 to which are secured, at diametrically opposed points, the ends of a second set of shift rods 100. Said shift rods 100 are parallel to the shift rods 90 and extend through the annular member 63 of the driven member 54. Said shift rods 100 extend through the annular flange 70 secured to said annular member 63 and each shift rod also extends through one of the circumferentially extending slots 72 in the plunger-carrying ring 68 mounted on said annular member 63.

The free end of each shift rod 100 extends beyond the annular member 63 and is provided with an enlargement or head 101 adapted to fit within the channel of an annular member 102 located in and adapted to have lateral sliding movement in an annular chamber 103 provided in the annular member 63 of the next adjacent driven member 53. Secured to said channeled member 102, at diametrically opposed points, are shift rods 104 extending through the annular member 63 of said driven member 53. Said shift rods 104 extend through said annular member 63 and also through the plunger-carrying ring 68 mounted on said annular member 63. The outer end of each shift rod 104 is provided with an enlargement or head 105 adapted to fit within the channel of an annular member 106 located in an annular chamber 107 provided in the annular member 63 of the next adjacent driven member 52. Said annular channeled member 106 is adapted to have lateral sliding movement in said annular chamber 107 in the endwise movement of the shift rods 100 and 104, respectively. Secured to said annular channeled member 106, at diametrically opposed points, are shift rods 108 extending partially through the annular member 63 of the driven member 52 and also through one of the slots 72 of the plunger-carrying ring 68. The free end of each of said shift rods 108 plays in a slot 109 in the annular member 63 of said driven member 52. The movement of the collar 87 endwise of the driven shaft 21 effects the endwise movement of the several shift rods for both the inner and outer plunger-carrying rings of all of the driven members 52, 53, and 54, as is apparent. In the driven members 52 and 53 the annular chambers 103 and 107 are formed in the members 75, 75 of said driven members, as shown. Each shift rod of each of the inner and outer sets of shift rods is provided intermediate its ends with a pair of cam projections 110, 111. (See Fig. 10.) Said cam projections 110, 111 project on opposite sides of the shift rod with which the same are connected. Said cam projections in the endwise movement of the several shift rods are adapted to pass through the circumferentially extending slots in the inner and outer plunger-carrying rings 58 and 68, respectively. In the endwise movement of the several shift rods in a direction to cause the cam projections 110 of each of said several shift rods to pass through the slots 62, 72 in the plunger-carrying rings 58 and 68, respectively, will effect the circumferential movement or shifting of the plunger-carrying rings in a direction to cause the spring pressed plungers carried thereby to be moved from one end of the slots or grooves 73 in the pawls 56, 64 to the other end of said slots. In this manner, said pawls may be rocked in their key seats, so as to cause one of the edges of said pawls to project into the annular space between the hub 55 and the annular member 63 of each of the several driven members 52, 53 and 54, respectively. By moving the several shift rods endwise in the opposite direction, the cam projections 111 will pass through the slots 62, 72 in the plunger-carrying rings 58, 68, and the shifting of said rings will be effected, in a direction opposite to that above referred to, so as to carry the several spring pressed plungers 59, 69 mounted on said rings to the opposite ends of the slots 73 in the several pawls 56, 64, and thus effect the rocking of said pawls in their seats in the opposite direction, so as to cause the opposite side edges of said pawls to project into the annular space between the hub 55 and the annular member 63 of each of the driven members hereinbefore mentioned. The cam projections 110, 111 on the inner set of shift rods 90, 94 and 97, respectively, are so arranged with respect to the cam projections of the outer set of shift rods 100, 104 and 108, respectively, that in the endwise movement of the several shift rods, the plunger carrying rings 58, 68, associated with each of said inner and outer sets of shift rods, will be shifted or moved circumferentially in opposite directions, so as to cause the inner set of spring pressed plungers 59, to project the side edges of the pawls 56 into the annular space between the hub and the annular members of each of the driven members, while the spring pressed plungers 69 of the outer set are moved in the opposite direction so as to cause the opposite side edges of the pawls 64 of the outer set to project into the annular space between the hub and the annular member 63 of each of the driven members.

The position of the parts above described is shown in Fig. 7 of the drawings. When the several parts occupy the position shown in said Fig. 7, the pawls of the inner and outer sets project into the annular space between the hub 55 and the annular member 63 of each driven member so that upon the upward movement of the annular member 63 one of the pawls 64 carried thereby will come into contact with one of the pawls 56 carried by the hub 55 and effect the locking of the hub 55 to the annular member 63, so that the upward rocking movement of the annular member 63 will be transmitted to the hub 55 and, consequently, to the driven shaft 21, with which said hub 55 has rigid connection. In order to reverse the direction of rotation of the driven shaft 21, the collar 87 is shifted endwise of the driven shaft 21 by the shifting yoke (not shown) in a direction to cause one of the cam projections on the shift rods to effect the circumferential movement or shifting of the inner and outer plunger carrying rings, so that the spring pressed plungers carried thereby will be removed from one end of the slots 73 to the opposite ends thereof and effect the rocking of the several pawls of both sets in a direction to cause their operative edges to project into the annular space between the hub 55 and the annular member 63. When the several pawls occupy the positions just referred to, the downward rocking movement imparted to the annular member 63 of each driven member will be imparted to the driven shaft 21 through the hub being locked to the annular member. In this manner the driven shaft 21 is rotated in a direction opposite to that given to the driving shaft.

Figure 9:
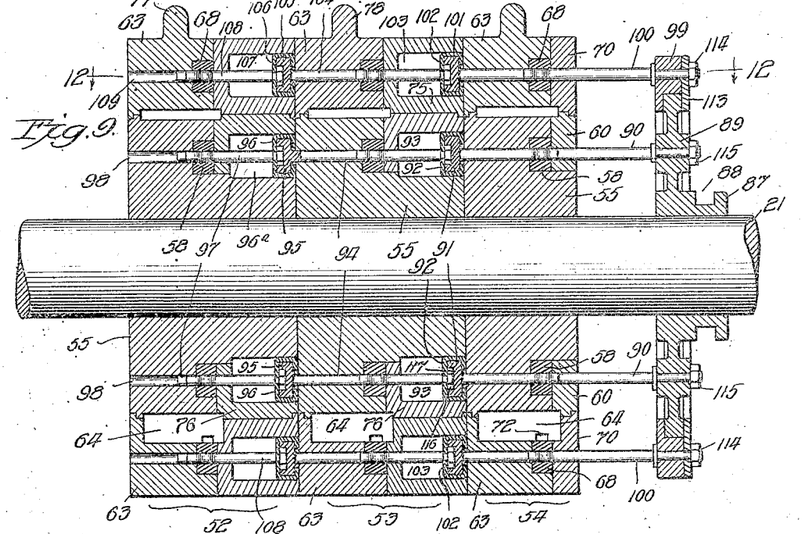
Fig. 9 is a sectional view taken on line 11—11 of Fig. 7, showing the plunger carrying rings and shifting devices therefor.
Figure 10:
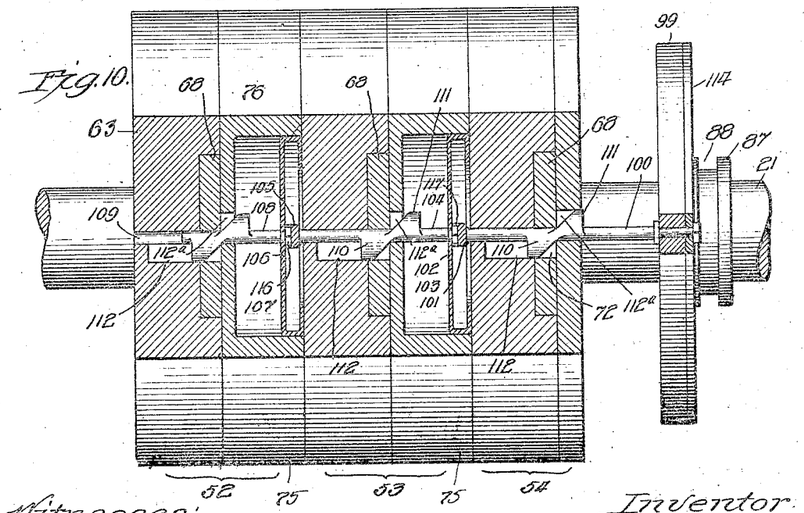
Fig. 10 is a sectional view taken on line 12—12 of Fig. 9.

In order that the cam projections 110 of each shift rod of the inner and outer sets may have movement with the shift rods, both the hub 55 and the annular member 63 of each driven member are provided with a recess or channel 112. The annular plates 60 and 70 of the driven member 54 as well as of the members 75 and 76 of each driven member 52 and 53 are each provided with a slot 112ª to accommodate the cam 111 of each shift rod in the endwise movement thereof. (See Fig. 10.) The annular ring 99 is maintained on the flange 89 of the collar 87 by means of an annular plate 113 clamped against said ring 99 by means of clamping nuts 114 applied upon the ends of the shift rods 100 extending through said ring 99. Said annular plate 113 overlaps the flange 89, as shown in Fig. 9. Said shift rods 90 are secured to said flange 89 by means of clamp nuts 115 applied upon the ends thereof which project beyond said flange. The annular members 75 and 76 are secured in any suitable manner to the hub 55 and annular member 63, respectively, and rotate therewith. As shown, machine screws 75ª, 76ª are provided for this purpose.

By reason of the fact that the shift rods of both the inner and outer sets are made in sections, and each section extending through its associated driven member, as above described, and provided with enlargements or headed ends which fit within channeled members, as above described, one driven member may have rotative movement relatively to the other driven member, the headed ends of said rods moving in the associated channeled members in the rotation of one driven member with respect to the other. By reason of the annular chambers in which said channeled members are located, the endwise movement of the several shift rods simultaneously is made possible, yet at the same time permitting one driven member to rotate or rock with respect to the other driven members. Each shift rod 94, 97 and 104, 108 of the inner and outer sets, respectively, is secured to the associated channeled member by means of clamp nuts 116 applied upon the threaded ends thereof inserted through one of the walls of said channeled members. In order that the headed ends of the shift rods 90 may move past and over the clamp nuts 116, located in the channeled member 92, each of said headed ends 91 is provided with a circumferential groove or slot 117. A like construction is provided for each of the other similar parts and such similar parts are indicated by like reference characters. The ring 113 is further secured to the member 99 by machine screws 118 inserted through said ring 113 and threaded into said member 99. (See Fig. 8.)

The operation of the transmission mechanism above described and shown in the accompanying drawings is as follows: The driving shaft 20 is rotated continuously in one direction, and the eccentrics 25, 26 and 27 mounted on said driving shaft 20 rotate therewith. When the finger 45 of the shift key 43 is in the spirally arranged slot 40 of the sleeve 39, said sleeve 39 is connected and rotates with the driving shaft 20 and the eccentric 25. Said sleeve 39 having rigid connection with the inner shiftable eccentric 28, said inner shiftable eccentric 28 rotates with the eccentric 25 and the driving shaft 20. Said inner shiftable eccentric 28 being connected by the pin 31 with the intermediate shiftable eccentric 29, and the latter being connected by the pin 32 with the outer shiftable eccentric 30, each of said shiftable eccentrics will rotate with the driving shaft 20. The distance between the parallel faces 42, 42 of the slot 40 at the entrance thereof is equal to the thickness of the finger 45.

Figure 12:
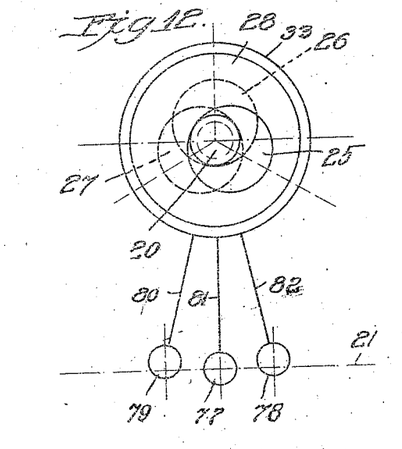
Figs. 12 and 13 are diagrammatic views showing the driving members of the transmission mechanism in two positions.

Said finger 45 is elongated and provided with flat parallel faces adapted to bear against the said faces 42, 42. By reason of this fact, the key 43 is maintained in a position with said finger 45 projecting into said slot at the entrance thereof. With the parts in the position just described and shown in Figs. 4, 5 and 6, the several shiftable eccentrics 28, 29 and 30 will occupy a position with their centers coinciding with each other and with the center of the driving shaft 20. In other words, the several shiftable eccentrics 28, 29 and 30, in such position, are concentric with each other and with the driving shaft 20. It follows, therefore, that the eccentric straps, 33, 34 and 35, working on said shiftable eccentrics receive, if any, but a small amount of movement during the rotation of said driving shaft 20. Consequently, the small amount of endwise movement that may be imparted to the operating or power arms 80, 81 and 82, respectively, by the said eccentric straps, is not sufficient to impart enough of a rocking movement to the rock-arms of the driven members 52, 53 and 54 to effect the engagement of the pawls of the driven members. Thus no rotary movement is given to the driven shaft 21. Fig. 12 illustrates, diagrammatically, this position of the several shiftable eccentrics just described. This position of the parts may be termed the "minimum" or "zero" position. Just as soon, however, as the shift key 43 is moved endwise in a direction toward the inner shiftable eccentric 28, the finger 45 of said shift key moves in said slot 40 and by reason of the spiral arrangement thereof and the fact that said finger moves in a straight path transverse to said slot 40, serves to effect the movement of the sleeve 39 circumferentially and likewise the inner shiftable eccentric 28 connected therewith. In the endwise movement of said key 43 toward the shiftable eccentric 28, the latter will be rotated or turned circumferentially about the driving shaft 20 and the fixed eccentric 25. By so turning or adjusting the shiftable eccentric 28, the center of the same will be moved into a position eccentric to the center of the driving shaft 20 and the inner eccentric 25 to effect the throwing of the center of said inner shiftable eccentric 28 eccentric to the center of the driving shaft 20. In other words, the center of the inner shiftable eccentric 28 is thrown from concentricity to eccentricity with respect to the center of the driving shaft 20. In view of the fact that the several shiftable eccentrics are connected together, any movement of the inner shiftable eccentric 28 to throw the center of the same out of coincidence with the center of the driving shaft 20, will impart a like movement to the other shiftable eccentrics connected therewith and effect the throwing of the centers of the other shiftable eccentrics out of coincidence with the center of the driving shaft 20. When the several shiftable eccentrics 28, 29 and 30 are in any position eccentric to the driving shaft 20, said shiftable eccentrics in the rotation of the driving shaft will, due to the eccentrics 25, 26 and 28, upon which they are mounted, impart an endwise movement to the operating or power arms 80, 81 and 82 connected with the eccentric straps 33, 34 and 35. The endwise movement of the operating arms serves to effect a rocking movement of the rock-arms 77, 78 and 79 of each of the driven members 52, 53 and 54, respectively. By adjusting said shiftable eccentrics circumferentially with respect to the driving shaft 20, so as to throw the centers thereof from concentricity to eccentricity with respect to the driving shaft 20 and with respect to each other, the throw of the shiftable eccentrics varies of course with the amount of adjustment given to the several shiftable eccentrics. In other words, the throw of the shiftable eccentrics increases as the shiftable eccentrics are moved from concentricity to extreme eccentricity with respect to the driving shaft 20.

Figure 13:
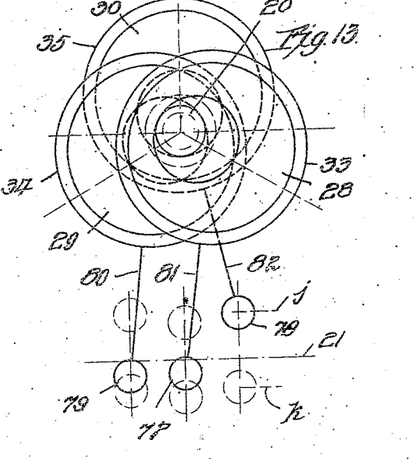
Figures 14, 15, 16, 17:
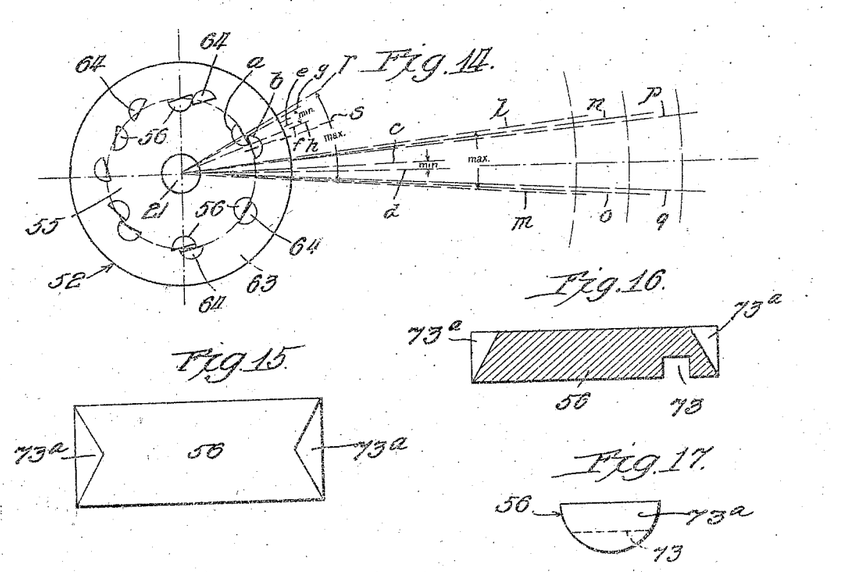
Fig. 14 is a diagrammatic view showing the pawl or locking tooth arrangement.
Figs. 15, 16 and 17 show a top plan, longitudinal vertical, sectional and end views, respectively, of one of the pawls to be hereinafter described.

The extreme position of the several shiftable eccentrics is shown, diagrammatically, in Fig. 13 of the drawings. When the several shiftable eccentrics are in position shown in Fig. 13, the eccentric straps working in the rotation of the driving shaft 20, by reason of the throw of said eccentrics, serve to effect the endwise movement of the operating or power arms 80, 81 and 82 to such an extent that the oscillatory or rocking movement imparted to said rock-arms is sufficient to cause the pawls 64 on the member 63 in the upward movement thereof to become engaged with the pawls on the hub and effect the rotation of the driven shaft. The plunger carrying rings 68 of the annular member 63 and the hub 55, respectively, have been previously shifted to positions shown in Fig. 7. The shaft 21 is rotated during the upward movement of the rock-arm. As soon as the rock-arm reaches the limit of its upward stroke and begins to move downward, the contacting pawls become disengaged and those carried by the annular member 63 ride over the ones on the hub 55, the plungers 59, 69 being forced into their seats in the passing of one pawl over the other. One rock-arm, in the upward movement thereof, moves ahead of the other rock-arms, and it follows that, when one rock-arm has just about completed its upward or power stroke, one of the other rock-arms has completed its downward or non-operative stroke and has just begun its upward stroke. The remainder of the three rock-arms is in the middle of its power or upward stroke. Thus continuity of rotation of the driven shaft 21 is gained. There are always two rock-arms on their power stroke, while the third rock-arm has just begun its power stroke. When the rock-arm starts its power stroke, the annular member 63 will be rotated but a short distance relative to the hub 55 before one of the pawls 64 comes into contact with one of the pawls 66 on the hub 55. The relative amount of movement between these parts is illustrated in Fig. 14 and will be referred to presently. The amount of rotary movement imparted to the driven shaft 21 depends upon the length of stroke of the power arms and those of course upon the throws of the shiftable eccentrics. When it is desired to rotate the driven shaft at a high rate of speed, the several shiftable eccentrics are adjusted in the manner above described to position so that the endwise movement imparted to the power or operating arms 80, 81 and 82 connected with the eccentric straps 33, 34 and 35 is of short duration, whereas should it be desired to rotate the driven shaft at a slow rate of speed the several shiftable eccentrics are adjusted to their extreme positions. It is of course understood that by adjusting the several shiftable eccentrics in any position between the minimum and the maximum that the rate of speed at which the driven shaft is driven will of course be varied accordingly. The parts are so constructed and arranged that there may be a position between minimum and maximum into which the several shiftable eccentrics may be adjusted, so that the rate of speed at which the driven shaft is driven will be the same as the rate of speed of the driving shaft, all positions beyond such position to maximum will of course cause the driven shaft to be driven at a rate of speed less than that at which the driving shaft is rotated. Thus it is possible, with my transmission device embracing only three main parts, to obtain a wide variation of speed that could not be otherwise obtained with a gear type of transmission device wherein only three transmission gears were employed.

By reason of the arrangement of the several parts of the transmission device herein described and shown in the accompanying drawings, the same is particularly applicable to motor vehicles, wherein the driving or engine shaft is arranged at right angles to the rear axle of the vehicle. The engine shaft, by reason of the transmission device herein described, may have direct connection with said rear axle without the employment of gears or like parts between the driving and driven members. On the other hand, when the shiftable eccentrics have been adjusted to minimum or zero position, the driving shaft runs free and no clutch is needed to effect the connection between said shafts when it is desired to start the driven shaft.

When it is desired to reverse the direction of rotation of the driven shaft, the ring 87 of the reversing mechanism is shifted endwise of the driven shaft 21; the plunger carrying rings 58, 68, respectively, are shifted or moved circumferentially with respect to the parts upon which said rings are mounted, the plungers carried by said rings rocking said pawls in their seats so as to cause the working edges of said pawls to project into the annular space between the parts of the driven members. When the rings 58, 68 have been shifted so that the plungers 59, 69 occupy positions opposite that shown in Fig. 7 of the drawings, the edges of the several pawls 56, 64 that lie within the key seats, as shown in said Fig. 7, will have been projected into the annular space between the part 63 and the hub 55 of the driven members, so that the upward rocking movement imparted to the rock-arms 77, 78 and 79 by the power or operating arms 80, 81 and 82 will have no effect upon the hub 55 and the several pawls will ride over each other in such upward rocking movement. In the downward rocking movement, however, of such rock-arms, one of the pawls carried by the annular member 63 will engage one of the pawls carried by the hub 55 and effect the locking of the member 63 and hub 55 together so that the downward rocking movement of the rock-arms will impart rotation to the driven shaft 21.

By reason of the fact that the pawls carried by the annular member 63 out number by one the pawls carried by the hub 55, there will always be one pawl on the hub 55 free and in position to be engaged by a pawl carried by the annular member 63 so that the movement of the annular member 63 before the pawls engage is practically negative, while there will always be one or more pawls in overlapping engagement.

In Fig. 14 is shown diagrammatically the distance the pawls or teeth of the inner and outer sets move with respect to each other when the rock-arms 77, 78 and 79 are given a minimum and a maximum movement by the power arms 80, 81 and 82. It will be noted that one of the pawls or teeth 56 carried by the hub 55 is overlapped approximately about one-half by the adjacent pawl 64 carried by the annular member 63. These two pawls have been indicated by $a$ and $b$, respectively, in said Fig. 14, for convenience in referring to these particular pawls. The rock-arms, when given a minimum amount of movement, each move an equal distance, the same being indicated in Fig. 14 by the distance between the radial lines c, d, and has been marked in said Fig. 14 as "Min." In such movement of the rock-arms, the pawl b is moved with respect to the pawl a a corresponding distance, the same being indicated in said Fig. 14, by the distance between the radial lines e, f. Consequently, the pawl b, in the minimum movement of the rock-arm, is never moved from overlapping engagement with the pawl a, and it naturally follows that no movement is given to the hub 55 because the minimum movement of the rock-arm is not sufficient to move the pawls into position to become locked together. As each rock-arm has the same amount of minimum movement, and as each rock-arm is so arranged as to move ahead of one of the others, the sum of the distances traveled in the minimum movement of all of the rock-arms will equal the sum of the distance moved by each of the rock-arms, and has been indicated in said Fig. 14 as the distance between the radial lines g, h. In said Fig. 14, this distance is marked "Min." Thus the movement that is given to the pawl b is not sufficient to cause the pawls a, b to be moved out of overlapping engagement, and, consequently, the pawls do not become connected so as to effect the rotation of the driven shaft 21. In the maximum movement of the rock-arms 77, 78 and 79, however, each rock-arm moves a distance indicated between the lines j, k, in Fig. 13. This distance for the rock-arm 78 has been indicated by the distance between the outer radial lines l, m, in Fig. 14, while the distance for the rock-arms 77 and 79 has been indicated as the distance between the inner radial lines n, o, and p, q, respectively, in said Fig. 14. It will be found that by taking the distance between the lines l, m, at the place where said lines cross the outer circle of the annular member 63, said distance equals the distance taken between the radial lines, r, s, at the points where said lines cross the same circle, thus indicating the amount of movement given to the pawl b in the maximum movement of the rock-arm associated therewith. It will be noted that in the maximum movement of the rock-arms, the pawl b moves rearwardly just far enough to clear the rearward edge of the adjacent pawl a and very little movement is required to bring the projecting edges of said pawls a, b, into contact and effect the locki ˙ of the parts 63 and 55. The movement that the pawl b is required to make before engaging the pawl a to effect the locking of such parts has been practically reduced to the minimum so that there is no appreciable amount of waste movement before the pawls are connected. This distance is indicated by the distance between lines h, s in said Fig. 14. The parts 55 and 63 are connected practically at the time one pawl moves out of overlapping engagement with the adjacent pawl. This distance of course decreases with the adjustment of the shiftable eccentrics from the extreme position toward the zero or minimum position. The total amount of rocking movement given to the pawls carried by the member 63, when the rock arms are given a maximum amount of movement is indicated as the distance between the radial lines r, m in said Fig. 14. Such distance is equal to three times the distance between the lines l, m at the points where the same cross the outer circle of the annular member 63. This distance is the maximum distance and has been denoted in said Fig. 14 as "Max." The distance the pawl b is required to move before coming into contact with the pawl a when the rock-arms are given a maximum amount of movement will be seen to be indeed small when compared with the full distance the pawls move.

Although, in Figs. 15, 16 and 17, the pawl therein shown is indicated by the reference character 56, thus indicating that it is one of the pawls of the inner set, it is to be understood that the pawls of the outer set are replicas of those of the inner set.

The shiftable eccentric member 28 and connected sleeve 39 are, as shown in Fig. 5, made in two parts provided with ends $36^a$, $37^a$, respectively, and connected by bolts $38^a$.

It is to be understood that the details of construction in the device herein illustrated and described may be variously modified without departure from the spirit of my invention, and I do not wish to be limited to the exact details of construction and arrangement shown, except as pointed out in the appended claims.

I claim as my invention:

1. In a power-transmitting mechanism, the combination with a rotative member, an oscillatory member mounted on said rotative member, said rotative member being provided with a plurality of rockably mounted spring pressed pawls, said oscillatory member being provided with at least one rockably mounted spring pressed pawl, adapted to have positive interlocking engagement with one of the pawls on the rotative member so as to connect said rotative and oscillatory members together in the rotation of said oscillatory member in one direction, means for rocking the pawls on both of said members for reversing the direction of rotation of said rotative member, and means for oscillating said oscillatory member.

2. In a power-transmitting mechanism, the combination with a rotative member, of an oscillatory member mounted on said rotative member, one of said members being provided with a seat, a pawl rockably mounted in said seat and adapted, when rocked in either direction, to have an edge thereof projected beyond said seat and positively engage the other of said members to lock said members together in the movement of said oscillatory member, a shift ring carried by said pawl-provided member and a spring pressed part adapted to engage said pawl, means for shifting said ring circumferentially in either direction, for reversing the direction of rotation of said rotative member, and means for oscillating said oscillatory member.

3. In a power-transmitting mechanism, the combination with a rotative member, an oscillatory member mounted on said rotative member, each of said members being provided with a plurality of rockably mounted pawls; at least one pawl on each member becoming operatively connected in the movement of said oscillatory member in one direction, a shift ring carried by each of said members and provided with a plurality of spring-pressed plungers adapted to engage said pawls, means for shifting said rings circumferentially in either direction, and means for oscillating said oscillatory member.

4. In a power-transmitting mechanism, the combination with a rotative member, an oscillatory member mounted on said rotative member, a plurality of pawls rockably mounted on each of said members; at least one pawl on each member having interlocking engagement in the movement of said oscillatory member in one direction, a shift ring carried by each of said members and provided with a plurality of spring-pressed plungers adapted to engage said pawls, each of said pawls being provided with a slot into which said plungers are adapted to project, means for shifting said rings circumferentially in either direction, and means for oscillating said oscillatory member.

5. In a power-transmitting mechanism, the combination with a rotative member, an oscillatory member mounted on said rotative member, a plurality of rockably mounted pawls on one of said members, a shift ring carried by said pawl provided member and having a transversely extending guideway, said ring being provided with a plurality of spring-pressed plungers adapted to engage said pawls, means for shifting said ring circumferentially in either direction including an endwise movable rod provided with cam members adapted in the endwise movement of said rod, to engage the ends of said guideway, and means for oscillating said oscillatory member.

6. In a power-transmitting mechanism, the combination with a plurality of rotative members, a plurality of oscillatory members, one for each of said rotative members, pawls rockably mounted on each of said rotative and oscillatory members, a shift ring carried by each of said rotative and oscillatory members, each ring being provided with a plurality of spring-pressed parts adapted to engage said pawls, means for shifting said rings circumferentially in either direction to effect the rocking of said pawls, embracing an endwise movable shift rod for each of said rotative and oscillatory members, each shift rod being provided with cam means adapted in the endwise movement of said rod, to engage and shift the associated shift ring, means for connecting the shift rods of each rotative member, and means for connecting the shift rods of each oscillatory member, permitting the associated rotative and oscillatory members to rotate relative to the next adjacent associated rotative and oscillatory members, while permitting the oscillatory members to rotate in either direction with respect to the associated rotative members, and means for oscillating said oscillatory members.

7. In a power-transmitting mechanism, the combination with two rotative members, an oscillatory member mounted on each of said rotative members, the rotative member and the oscillatory member mounted thereon constituting a set of such members; a plurality of pawls rockably mounted on each of said rotative and oscillatory members, a ring carried by and circumferentially adjustable on each of said rotative and oscillatory members, spring-pressed parts on said rings adapted to engage said pawls, means for shifting said rings circumferentially in either direction, including an endwise movable shift rod for each of said rotative and oscillatory members, each shift rod being provided with cam members adapted in the endwise movement of said rod, to engage and shift its associated shift ring, an annular channeled member slidably mounted on each of the rotative and oscillatory members of one set, the shift rods on such members being rigidly connected with said annular channeled members, the shift rods on the other set of rotative and oscillatory members being provided with enlarged ends slidably confined in said annular channeled members, and means for oscillating said oscillatory members.

8. In a power-transmitting mechanism, the combination with a rotative member, an oscillatory member mounted on said rotative member, each of said members being provided with a plurality of rockably mounted pawls, said pawls being provided in their ends with inwardly directed recesses, lugs provided on said rotative and oscillatory members adapted to project into said recesses, and means for oscillating said oscillatory member.

9. In a power-transmitting mechanism, the combination with a rotative member, an oscillatory member mounted on said rotative member, pawls rockably mounted on each of said members, shift rings mounted on each of said members and provided with spring-pressed plungers adapted to engage said pawls, a plurality of endwise movable shift rods extending through slots in said shift rings and provided with cam members adapted in the endwise movement of said rods to pass through said slots to effect the shifting of said rings, and means for oscillating said oscillatory member.

10. In a power-transmitting mechanism, the combination with a plurality of rotative members, a plurality of oscillatory members mounted on said rotative members, pawls rockably mounted on each of said rotative and oscillatory members; at least one of the pawls on each of said rotative and oscillatory members becoming interlocked in the movement of said oscillatory member in one direction, means for rocking the pawls on each of said members including endwise movable shift rods, means for connecting the shift rods of the rotative and oscillatory members, respectively, permitting the adjacent oscillatory and rotative members to have rotative movement independently of each other, and means for oscillating each oscillatory member.

11. In a power-transmitting mechanism, the combination with a rotative member, of an oscillatory member mounted on said rotative member, each of said members being provided with a plurality of rockably mounted pawls; the pawls of one of said members outnumbering the pawls on the other of said members, said pawls being arranged so that at least one of said pawls on each member has interlocking engagement in the movement of one of said members in one direction; the pawls on said members next adjacent to the interlocked pawls being in overlapped relation, means for rocking said pawls on both members for reversing the direction of rotation of said rotative member, and means for oscillating said oscillatory member.

12. In a power-transmitting mechanism, the combination with a shaft, of a plurality of rotative members, mounted thereon, an oscillatory member for each rotative member, spring-pressed pawls rockably mounted on each of said rotative and oscillatory members; at least one pawl on each associated rotative and oscillatory member having engagement, when said oscillatory member is moved in one direction, means for rocking said pawls, including an endwise movable shift rod for each of said members, the shift rods on said rotative members being connected together, and the shift rods on said oscillatory members being connected together by means permitting the oscillatory members to have rotative movement relative to each other and to said rotative members, a member mounted on and adapted to be moved endwise of said shaft and connected with the shift rods of the adjacent set of rotative and oscillatory members, and means for oscillating said oscillatory members.

13. In a power-transmitting mechanism, the combination with a shaft, of a plurality of rotative members mounted thereon, an oscillatory member for each rotative member, spring-pressed pawls rockably mounted on each of said rotative and oscillatory members; at least one pawl on each associated rotative and oscillatory member having engagement, when said oscillatory member is moved in one direction, means for rocking said pawls, including an endwise movable shift rod for each of said members, the shift rods on said rotative members being connected together, and the shift rods on said oscillatory members being connected together by means permitting the oscillatory members to have rotative movement relative to each other and to said rotative members, a member mounted on and adapted to be moved endwise of said shaft, said member comprising two parts, one rotatively mounted with respect to the other, one of the parts being connected with the shift rod of the adjacent rotative member and the other part being connected with the shift rod of the adjacent oscillatory member, and means for oscillating said oscillatory members.

14. In a power-transmitting mechanism, the combination of a driving shaft and a driven shaft, one arranged at right angles to the other, a rotative member connected with and adapted to effect the rotation of said driven shaft, an oscillatory member mounted on said rotative member, each of said members being provided with a plurality of rockably mounted pawls; at least one pawl on each member becoming operatively connected in the movement of said oscillatory member in one direction, a shift ring carried by each of said members and provided with a plurality of spring-pressed parts adapted to engage said pawls, means for shifting said shift rings circumferentially in either direction, and means connecting said oscillatory member with the other of said shafts, whereby the latter when rotated will effect the oscillation of said oscillatory member.

In testimony, that I, claim the foregoing as my invention I affix my signature in the presence of two witnesses, this 16th day of September A. D. 1913.

LEON J. CAMPBELL.

Witnesses:
EUGENE C. WANN,
MAURICE D. HERMAN.